US011880032B2

(12) United States Patent
Lee et al.

(10) Patent No.: US 11,880,032 B2
(45) Date of Patent: *Jan. 23, 2024

(54) RESONANT FREQUENCY TUNING OF MICROMACHINED MIRROR ASSEMBLY

(71) Applicant: BEIJING VOYAGER TECHNOLOGY CO., LTD., Beijing (CN)

(72) Inventors: Sae Won Lee, Mountain View, CA (US); Youmin Wang, Mountain View, CA (US); Qin Zhou, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,546

(22) Filed: Oct. 20, 2022

(65) Prior Publication Data

US 2023/0045320 A1 Feb. 9, 2023

Related U.S. Application Data

(63) Continuation of application No. 16/658,007, filed on Oct. 18, 2019, now Pat. No. 11,536,951.

(51) Int. Cl.
*G02B 26/08* (2006.01)
*G02B 7/182* (2021.01)
*G01S 17/88* (2006.01)
*B60R 1/12* (2006.01)

(52) U.S. Cl.
CPC ....... *G02B 26/0841* (2013.01); *G02B 7/1821* (2013.01); *B60R 1/12* (2013.01); *G01S 17/88* (2013.01)

(58) Field of Classification Search
CPC .... G02B 26/0841; G02B 7/1821; B60R 1/12; G01S 17/88
See application file for complete search history.

(56) References Cited

U.S. PATENT DOCUMENTS 7,034,370 B2 * 4/2006 Kuo ................... G02B 26/0841
257/500
11,536,951 B2 * 12/2022 Lee ................... G02B 26/0841
2004/0099739 A1 5/2004 Kuo et al.

* cited by examiner

Primary Examiner — Euncha P Cherry
(74) Attorney, Agent, or Firm — BAYES PLLC

(57) ABSTRACT

Embodiments of the disclosure provide a micromachined mirror assembly. The micromachined mirror assembly includes a micro mirror configured to tilt around an axis and a first and a second torsion beam each having a first and a second end. The second end of the first torsion beam and the second end of the second torsion beam are mechanically coupled to the micro mirror along the axis. The micromachined mirror assembly also includes a first DC voltage applied to the first end of the first torsion beam and a second DC voltage, different from the first DC voltage, is applied to the first end of the second torsion beam.

20 Claims, 8 Drawing Sheets

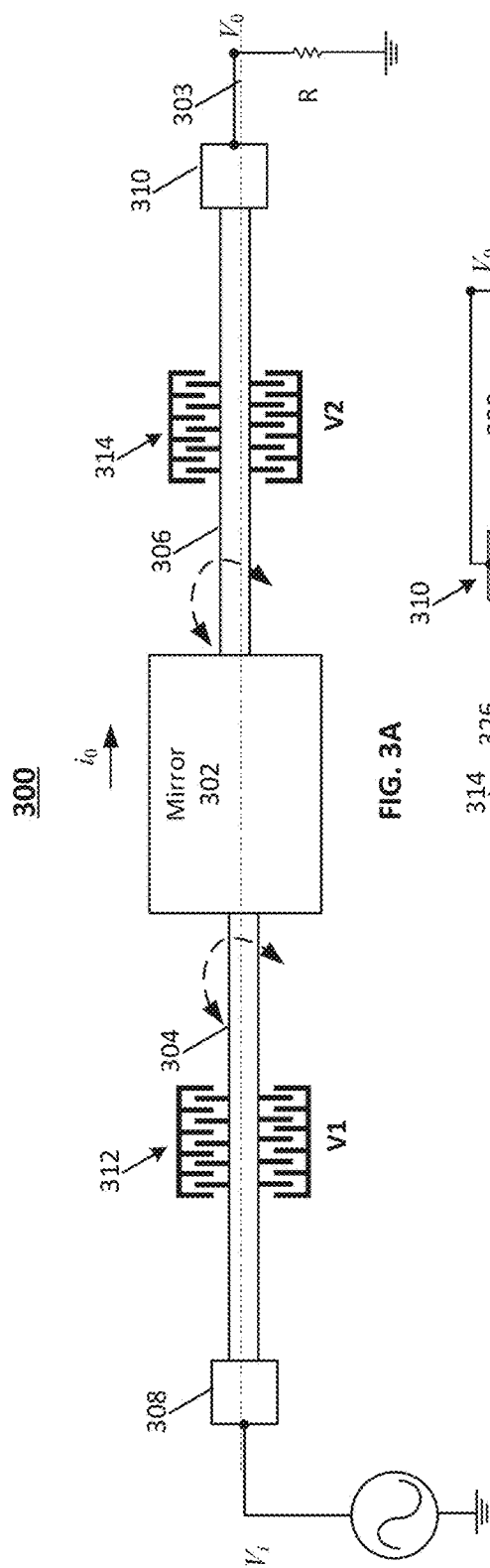

700

```
┌─────────────────────────────────────────────────────────────────────┐
│ Set a resonant frequency of a micromachined mirror assembly at an initial value │
│                                S702                                 │
└─────────────────────────────────────────────────────────────────────┘
                                   │
                                   ▼
                ┌──────────────────────────────────────┐
                │ applying a DC voltage difference to the │
                │   micromachined mirror assembly to    │
                │ decrease the resonant frequency to a 1st │
                │ operational value smaller than the initial │
                │     value during operation of the      │
                │     micromachined mirror assembly      │
                │                S704                    │
                └──────────────────────────────────────┘
```

RESONANT FREQUENCY TUNING OF MICROMACHINED MIRROR ASSEMBLY

CROSS-REFERENCE TO RELATED APPLICATION

This is a continuation to U.S. application Ser. No. 16/658,007, filed Oct. 18, 2019, which is incorporated by reference in its entirety herein.

TECHNICAL FIELD

The present disclosure relates to a micromachined mirror assembly, and more particularly to, a micromachined mirror assembly used in a scanner for light detection and ranging (LiDAR).

BACKGROUND

LiDAR systems have been widely used in autonomous driving and producing high-definition maps. For example, LiDAR systems measure distance to a target by illuminating the target with pulsed laser light and measuring the reflected pulses with a sensor. Differences in laser return times and wavelengths can then be used to make digital three-dimensional (3-D) representations of the target. The laser light used for LiDAR scan may be ultraviolet, visible, or near infrared. Because using a narrow laser beam as the incident light from the scanner can map physical features with very high resolution, a LiDAR system is particularly suitable for applications such as high-definition map surveys.

The scanner of a LiDAR system includes a mirror that can be moved (e.g., rotated) by actuators to reflect (and steer) incident laser beams from a laser source towards a predetermined angle. The mirror can be a single, or an array of micromachined mirror assembly(s) made by semiconductor materials using microelectromechanical system (MEMS) technologies. In order to maximize the deflection angle of the micromachined mirror assemblies for a given voltage, they are operated in their resonant frequency. However, due to fabrication process variations, resonant frequency of each of the micromachined mirror of the same array of micromachined mirror assembly(s) may vary. For example, structures etched on a single crystalline wafer may suffer from greater fabrication process variations (e.g., the lower part of the structure is narrower than the design due to the etching process) when the structure is closer to the edge of the wafer comparing to structures that is located in the center of the wafer. Thus, achieving the target resonant frequency becomes especially important when multiple micro mirrors need to be synchronized to operate at the same resonant frequency.

Embodiments of the disclosure address the above problems by an improved micromachined mirror assembly in a scanner for LiDAR.

SUMMARY

Embodiments of the disclosure provide a micromachined mirror assembly. The micromachined mirror assembly includes a micro mirror configured to tilt around an axis and a first and a second torsion beam each having a first and a second end. The second end of the first torsion beam and the second end of the second torsion beam are mechanically coupled to the micro mirror along the axis. The micromachined mirror assembly also includes a first DC voltage applied to the first end of the first torsion beam and a second DC voltage, different from the first DC voltage, is applied to the first end of the second torsion beam.

Embodiments of the disclosure also provide another micromachined mirror assembly. The micromachined mirror assembly includes a micro mirror configured to tilt around an axis and a first and a second torsion beam each mechanically coupled to the micro mirror along the axis. The micromachined mirror assembly also includes a first torsional actuator mechanically coupled to the first torsion beam and configured to apply a first torsional stress around the axis to the first torsion beam and a second actuator mechanically coupled to the second torsion beam and configured to apply a second torsional stress around the axis to the second torsion beam. The micromachined mirror assembly further includes a DC voltage difference applied to the first torsion beam and the second torsion beam.

Embodiments of the disclosure also provide a method for driving a micromachined mirror assembly. A resonant frequency of the micromachined mirror assembly is set at an initial value. A DC voltage difference along an axis of the micromachined mirror assembly to decrease the resonant frequency to a first operational value lower than the initial value during operation of the micromachined mirror assembly.

It is to be understood that both the foregoing general description and the following detailed description are exemplary and explanatory only and are not restrictive of the invention, as claimed.

BRIEF DESCRIPTION OF THE DRAWINGS

FIG. 3A illustrates a schematic diagram of an exemplary micromachined mirror assembly, according to embodiments of the disclosure.

FIG. 3B illustrates a top perspective view of the exemplary micromachined mirror assembly in FIG. 3A, according to embodiments of the disclosure.

FIG. 7 illustrates a flow chart of an exemplary method for driving a micromachined mirror assembly, according to embodiments of the disclosure.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
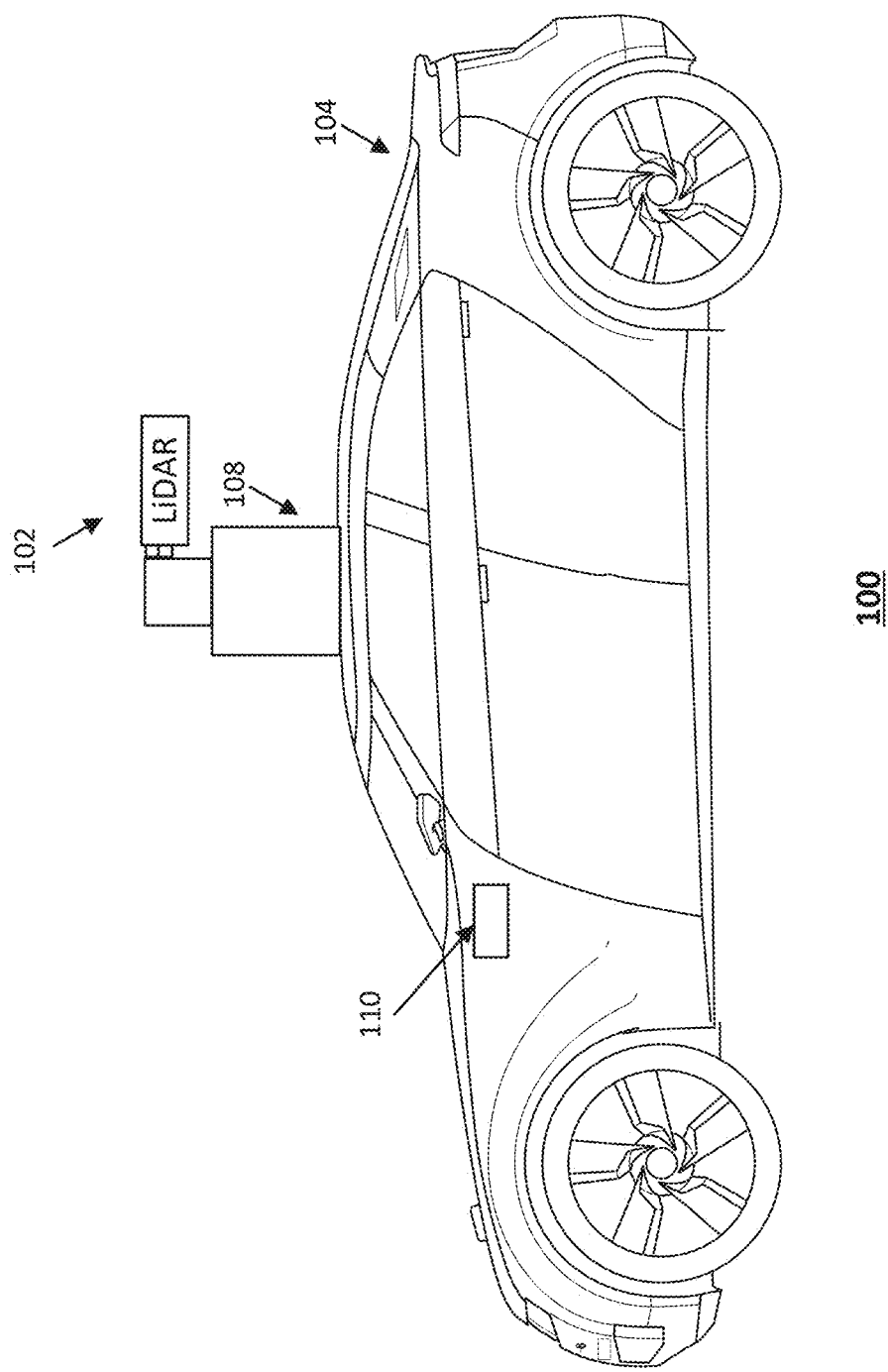
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a LiDAR system 102, according to embodiments of the disclosure. Consistent with some embodiments, vehicle 100 may be a survey vehicle configured for acquiring data for constructing a high-definition map or 3-D buildings and city modeling.

As illustrated in FIG. 1, vehicle 100 may be equipped with LiDAR system 102 mounted to a body 104 via a mounting structure 108. Mounting structure 108 may be an electromechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3-D sensing performance.

Consistent with some embodiments, LiDAR system 102 and sensor 110 may be configured to capture data as vehicle 100 moves along a trajectory. For example, a transmitter of LiDAR system 102 is configured to scan the surrounding and acquire point clouds. LiDAR system 102 measures distance to a target by illuminating the target with pulsed laser beam and measuring the reflected pulses with a receiver. The laser beam used for LiDAR system 102 may be ultraviolet, visible, or near infrared. In some embodiments of the present disclosure, LiDAR system 102 may capture point clouds. As vehicle 100 moves along the trajectory, LiDAR system 102 may continuously capture data. Each set of scene data captured at a certain time range is known as a data frame.

Figure 2:
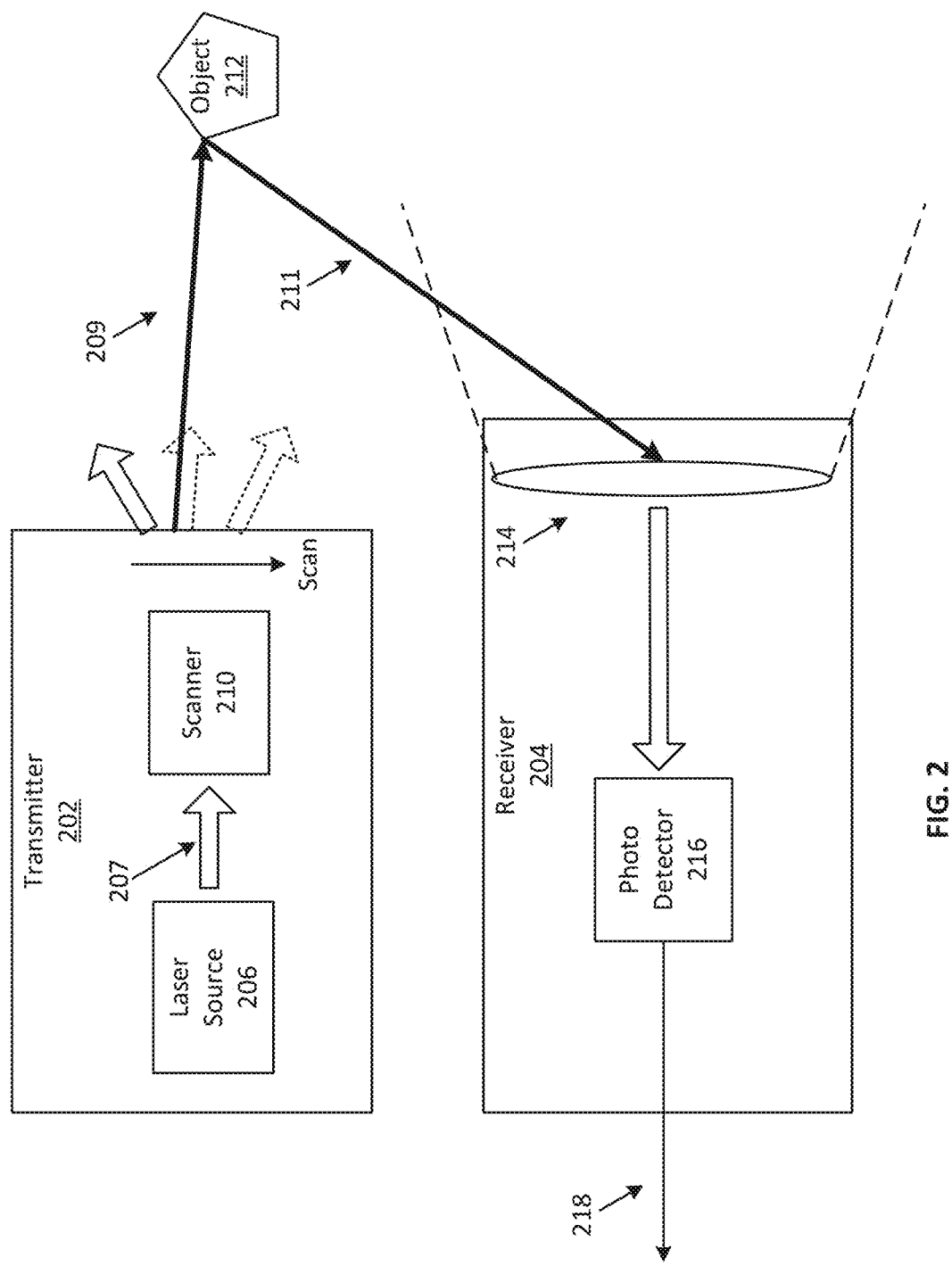
FIG. 2 illustrates a block diagram of an exemplary LiDAR system having a transmitter with a scanner, according to embodiments of the disclosure.

FIG. 2 illustrates a block diagram of an exemplary LiDAR system 102 having a transmitter 202 with a scanner 210, according to embodiments of the disclosure. LiDAR system 102 may include transmitter 202 and a receiver 204. Transmitter 202 may emit laser beams within a scan angle. Transmitter 202 may include one or more laser sources 206 and a scanner 210. As described below in detail, scanner 210 may include a micromachined mirror assembly (not shown) having a resonant frequency that can be tuned during the operation of the micromachined mirror assembly.

As part of LiDAR system 102, transmitter 202 can sequentially emit a stream of pulsed laser beams in different directions within its scan angle, as illustrated in FIG. 2. Laser source 206 may be configured to provide a laser beam 207 (referred to herein as "native laser beam") in a respective incident direction to scanner 210. In some embodiments of the present disclosure, laser source 206 may generate a pulsed laser beam in the ultraviolet, visible, or near infrared wavelength range.

In some embodiments of the present disclosure, laser source 206 is a pulsed laser diode (PLD). A PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 207 provided by a PLD may be smaller than 1,100 nm, such as 405 nm, between. 445 nm and 465 nm, between 510 nm and 525 nm, 532 nm, 635 nm, between 650 nm and 660 nm, 670 nm, 760 nm, 785 nm, 808 nm, or 848 nm.

Scanner 210 may be configured to emit a laser beam 209 to an object 212 in a first direction. Object 212 may be made of a wide range of materials including, for example, non-metallic objects, rocks, rain, chemical compounds, aerosols, clouds and even single molecules. The wavelength of laser beam 209 may vary based on the composition of object 212. At each time point during the scan, scanner 210 may emit laser beam 209 to object 212 in a direction within the scan angle by rotating the micromachined mirror assembly as the incident angle of incident laser beam 207 may be fixed. In some embodiments of the present disclosure, scanner 210 may also include optical components (e.g., lenses, mirrors) that can focus pulsed laser light into a narrow laser beam to increase the scan resolution and range of object 212.

As part of LiDAR system 102, receiver 204 may be configured to detect a returned laser beam 211 returned from object 212 in a different direction. Receiver 204 can collect laser beams returned from object 212 and output electrical signal reflecting the intensity of the returned laser beams. Upon contact, laser light can be reflected by object 212 via backscattering, such as Rayleigh scattering, Mie scattering, Raman scattering, and fluorescence. As illustrated in FIG. 2, receiver 204 may include a lens 214 and a photodetector 216. Lens 214 may be configured to collect light from a respective direction in its field of view (FOV). At each time point during the scan, returned laser beam 211 may be collected by lens 214. Returned laser beam 211 may be returned from object 212 and have the same wavelength as laser beam 209.

Photodetector 216 may be configured to detect returned laser beam 211 returned from object 212. Photodetector 216 may convert the laser light (e.g., returned laser beam 211) collected by lens 214 into an electrical signal 218 (e.g., a current or a voltage signal). The current is generated when photons are absorbed in the photodiode. In some embodiments of the present disclosure, photodetector 216 may include an avalanche photodiode (APD), such as a single photon avalanche diode (SPAD), a SPAD array, or a silicon photo multiplier (SiPM).

Although scanner 210 is described as part of transmitter 202, it is understood that in some embodiments, scanner 210 can be part of receiver 204, e.g., before photodetector 216 in the light path. The inclusion of scanner 210 in receiver can ensure that photodetector 216 only captures light, e.g., returned laser beam 211 from desired directions, thereby avoiding interferences from other light sources, such as the sun and/or other LiDAR systems. By increasing the aperture of mirror assembly in scanner 210 in receiver 204, the sensitivity of photodetector 216 can be increased as well.

As described above, the incident angle of incident laser beam 207 may be fixed relative to scanner 210, and the scanning of laser beam 209 may be achieved by rotating a single micro mirror or an array of micromachined mirror assembly in scanner 210. FIG. 3A illustrates a schematic diagram of an exemplary micromachined mirror assembly 300, according to embodiments of the disclosure. FIG. 3B illustrates a top perspective view of micromachined mirror assembly 300 in FIG. 3A, according to embodiments of the disclosure. Different from some micromachined mirror assemblies having fixed resonant frequencies that cannot be adjusted during the operation, the operational resonant frequency of micromachined mirror assembly 300 can be adjusted online during the operation, thereby allowing resonant frequency compensation due to temperature variation and/or enabling resonant frequency match among multiple micromachined mirror assemblies (e.g., in an array) due to fabrication process variation.

As illustrated in FIGS. 3A-3B, micromachined mirror assembly 300 may include a micro mirror 302 and a pair of first and second torsion beams 304 and 306 mechanically connected to micro mirror 302 along an axis 303 of micro mirror 302. Micro mirror 302 may be configured to tilt around axis 303 as torsion beams 304 and 306 rotate due to the rigid joint between micro mirror 302 and torsion beams 304 and 306. In some embodiments, micro mirror 302 and torsion beams 304 and 306 are formed using MEMS microfabrication techniques from a same rigid semiconductor structure, such as a single crystalline silicon wafer. Micro mirror 302 may be covered by a reflective layer disposed on its top surface (facing incident laser beam). The reflective layer may be reflective to an incident laser beam, which is reflected by micromachined mirror assembly 300 to form a reflected laser beam. By tilting micro mirror 302, the incident laser beam may be reflected to a different direction, i.e., to form another reflected laser beam. It is understood that although micro mirror 302 is in a rectangle shape as shown in FIGS. 3A-3B, it is understood that the shape of micro mirror 302 is not limited to a rectangle shape and may vary in other examples, such as a square, round, or eclipse shape.

Micromachined mirror assembly 300 may further include a pair of first and second anchors 308 and 310 each mechanically coupled to a respective end of torsion beam 304 or 306 that is farther away from micro mirror 302 and along axis 303. The other end of torsion beam 304 or 306 is mechanically coupled to micro mirror 302. Each one of anchors 308 and 310 is affixed on a base (not shown) of micromachined mirror assembly 300, according to some embodiments. Anchors 308 and 310 may be affixed to the base as both are formed using MEMS microfabrication techniques from a same rigid semiconductor structure, such as a single crystalline silicon wafer or may be joined together using thermal bonding, adhesive bonding, or soldering. Each one of torsion beams 304 and 306 is suspended from the base, i.e., leaving a space therebetween, to allow certain movement (e.g., rotation and/or displacement) of torsion beams 304 and 306 with respect to the base and anchors 308 and 310. In some embodiments, each one of torsion beams 304 and 306 is configured to tilt around axis 303, thereby driving the rotation of micro mirror 302. In some embodiments, each one of torsion beams 304 and 306 is made of a rigid material, such as silicon, with substantially zero displacement in a direction along axis 303 (i.e., the axial direction).

As illustrated in FIGS. 3A-3B, a first DC voltage $V_i$ may be applied to torsion beam 304 and a second DC voltage $V_0$ may be applied to torsion beams. In some embodiments, the voltage may be provided using an electrical power source such as an AC- to DC supply, a switched-mode power supply, a linear regulator etc. For example, a first electrode may be applied to anchor 308 to provide first DC voltage $V_i$ and a second electrode may be applied to anchor 310 to provide second DC voltage $V_0$. First DC voltage $V_i$ and second DC voltage $V_0$ may have different values resulting in current $i_0$ to pass through torsion beams 304 and 306, and micro mirror 302. Current $i_0$ may be transformed into heat on torsion beams 304 and 306, and micro mirror 302. The heat will change the temperature of components of micromachined mirror assembly 300 especially torsion beams 304 and 306 because of its relatively high electrical resistance due to its' shape. For crystalline materials such as single crystalline silicon wafer, the Young's modulus for the material can be increased when the temperature increases. The temperature dependence of Young's modulus for crystalline materials can be attributed to the enharmonic effects of lattice vibrations and also to changes in the bond length with temperature. The increase of Young's modulus can cause the resonant frequency of micromachined mirror assembly 300 to decrease.

On the other hand, the heat may also cause thermal expansion of torsion beams 304 and 306, and thus be transformed into compression stresses applied to micro mirror 302. The thermal expansion and the compression stresses may cause a decrease of the operational resonant frequency of micro mirror 302. In some embodiments, the change of operational resonant frequency of micro mirror 302 may be calculated by equation (1):

$$f_o \cong f_{nom}\left\{1 - \frac{1}{2}\frac{V_P^2 \varepsilon_o h W_e}{[d_o + (\alpha_{sub} - \alpha_e)L_e(T - T_o)]^3 k_m}\right\} \quad (1)$$

where $f_{nom}$ is the center frequency of micro mirror 302 at a nominal temperature $T_0$ and with $V_P$=0V, $k_m$ is the integrated mechanical stiffness of micro mirror 302 at its midpoint, $d_o$ is the electrode-to-torsion beam gap spacing at $T_o$, $W_e$ is the width of the electrode, $L_e$ is the length of the suspended portion of the electrode (that is free to expand), $\alpha_e$ and $\alpha_{sub}$ are the thermal expansion coefficients of the electrode and substrate materials, respectively.

In some embodiments, first DC voltage $V_i$ and second DC voltage $V_0$ is maintained during the operation of micromachined mirror assembly 300, thereby tuning the operational resonant frequency of micro mirror 302 from its initial resonant frequency. For one specific example, the DC voltage difference between first voltage $V_i$ and second DC voltage $V_0$ may be about 3V (e.g., 0V for first DC voltage $V_i$ and −3V for second DC voltage $V_0$, or 3V for first voltage $V_i$ and 0V for second DC voltage $V_0$). Current $i_0$ may be about 100 mA based on the electrical resistance of all components of micromachined mirror assembly 300 along axis 303. The heat generated on torsion beams 304 and 306 and micro mirror 302 may be transformed into thermal expansion and compression stresses applied to micro mirror 302 causing the operational resonant frequency of micro mirror 302 to decrease from about 5000 Hz to about 4950 Hz.

In some embodiments, an electrical resistance R may be added between the electrodes as part of an overload protection circuit to protect the circuit from overcurrent. It is understood that the direction of current $i_0$ may not affect the decrease of the operational resonant frequency of micro mirror 302.

As illustrated in FIGS. 3A-3B, micromachined mirror assembly 300 may further include a pair of first and second actuators 312 and 314 mechanically coupled to pair of torsion beams 304 and 306, respectively. A first actuator 312 may be configured to apply a first torsional stress around axis 303 to a first torsion beam 304, and a second actuator 314 may be configured to apply a second torsional stress around axis 303 to a second torsion beam 306. Consistent with some embodiments of the present disclosure, in some embodiments, the first torsional stress and second torsional stress have the same predetermined magnitudes resulting in torsion beams 304 and 306 along with micro mirror 302 to rotate along axis 303 at substantially the operational resonant frequency of micro mirror 302 (e.g., at the operational resonant frequency of micro mirror 302).

In some other embodiments, the first torsional stress and second torsional stress may have different magnitudes resulting in torsional stresses on torsion beams 304 and 306. For example, first and second actuators 312 and 314 may create unbalanced torsional stresses on torsion beams 304 and 306 on different sides of micro mirror 302 along axis 303. The unbalanced torsional stresses (i.e., a torsion) can be translated into a tensional stress in the axial direction, which can increase the resonant frequency of micro mirror 302. In some embodiments, the tensional stress caused by the torsion is maintained during the operation of micromachined mirror assembly 300, thereby tuning the operational resonant frequency of micro mirror 302 from its initial resonant frequency. It is understood that the direction of torsion may not affect the increase of the operational resonant frequency of micro mirror 302. That is, the first torsional stress applied by first actuator 312 may be greater than the second torsional stress applied by second actuator 314, or vice versa.

As illustrated in FIGS. 3A-3B, first and second actuators 312 and 314 may be electrostatic actuators, such as a set of comb drives. Electrostatic actuators rely on the force between two conducting electrodes when a voltage is applied between them. Depending on the arrangement of the electrodes, various types of electrostatic actuators are possible, such as comb drive electrostatic actuators, parallel plate electrostatic actuators, rotational electrostatic actuators cantilever electrostatic actuators, to name a few. For example, as shown in FIG. 3B, first actuator 312 may be an electrostatic comb drive actuator that includes a moveable comb 320 fixed to first torsion beam 304 and a pair of fixed combs 322 and 324 fixed to the base on different sides of first torsion beam 304. First torsion beam 304 and moveable comb 320 may be arranged in a plane above fixed combs 322 and 324. By alternatingly applying a voltage signal to the pair of fixed combs 322 and 324, first torsion beam 304 and moveable comb 320 can tilt around axis 303. Similarly, second actuator 314 may be an electrostatic comb drive actuator that includes moveable comb 326 fixed to second torsion beam 306 and a pair of fixed combs 328 and 330 fixed to the base on different sides of second torsion beam 306. Second torsion beam 306 and moveable comb 326 may be arranged in a plane above fixed combs 328 and 330. By alternatingly applying a voltage signal to the pair of fixed combs 328 and 330, second torsion beam 306 and moveable comb 326 can tilt around axis 303 as well.

Figure 4A:
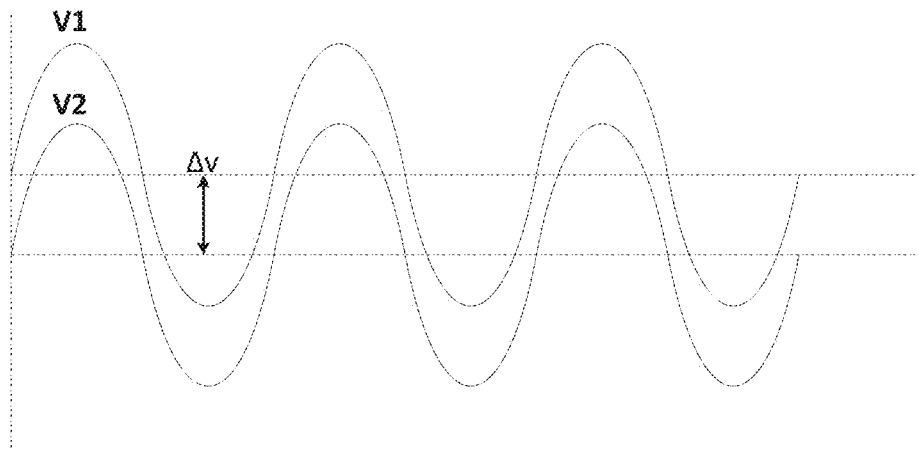
FIG. 4A illustrates a waveform of an exemplary voltage signal applied to the actuators of a micromachined mirror assembly, according to embodiments of the disclosure.
Figure 4B:
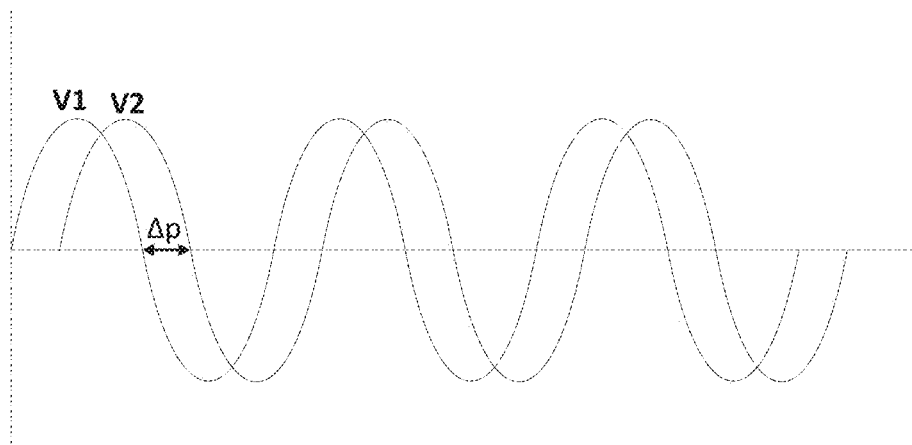
FIG. 4B illustrates a waveform of another exemplary voltage signal applied to the actuators of a micromachined mirror assembly, according to embodiments of the disclosure.

In some embodiments, the unbalanced torsional stresses created by first and second actuators 312 and 314 are achieved by applying two different AC voltages V1 and V2 to first and second actuators 312 and 314, respectively. The difference between AC voltages V1 and V2 may be converted into the magnitude difference of the first and second torsional stresses by a pair of electrostatic actuators, such as two sets of comb drives, as shown in FIGS. 3A-3B. The difference between AC voltages V1 and V2 may be created in any suitable ways, such as by introducing a DC offset (DC bias) or a phase offset (phase shift). For example, as shown in FIG. 4A, a DC offset Av may be applied to one of the two AC voltages, such as V1, to cause the difference of voltage magnitude between V1 and V2 at each time point. In another example as shown in FIG. 4B, a phase offset may be applied to one of the two AC voltages, such as V2, to cause a phase shift in V2 relative to V1. The phase shift in turn can cause the difference of voltage magnitude between V1 and V2 at each time point. In some embodiments, the difference of voltage magnitude between V1 and V2 is maintained to be at substantially the same level at each time point to maintain a constant operational frequency increase during the entire operation cycle. The control of voltage signals V1 and V2 may be achieved by a controller (not shown) operatively coupled to first and second actuators 312 and 314 to create and maintain the operational frequency increase as the desired level.

It is understood that the type of electrostatic actuators for creating unbalanced torsional stresses is not limited to comb drive actuators and can include any other suitable electrostatic actuators, such as parallel plate electrostatic actuators, rotational electrostatic actuators, or cantilever electrostatic actuators, to name a few. It is also understood that the type of actuators for creating unbalanced torsional stresses is not limited to electrostatic actuators and can include any other suitable actuators, such as piezoelectric actuators, electromagnetic actuators, thermal actuators, etc.

As described above, the current introduced by first DC voltage $V_i$ and second DC voltage $V_0$ may decrease the resonant frequency of micro mirror 302 from its initial resonant frequency and optionally in some embodiments, the torsion induced by first and second actuators 312 and 314 can increase the resonant frequency of micro mirror 302 from its initial resonant frequency. In some embodiments, a controller (not shown) is configured to dynamically tune the operational resonant frequency of micro mirror 302 by adjusting the voltage signals V1 and V2 applied to first and second actuators 312 and 314 and/or adjusting the current $i_0$ passes through torsion beams 304 and 306 and micro mirror 302 by adjusting first DC voltage $V_i$ and second DC voltage $V_0$ applied to torsion beams 304 and 306.

Figure 5:
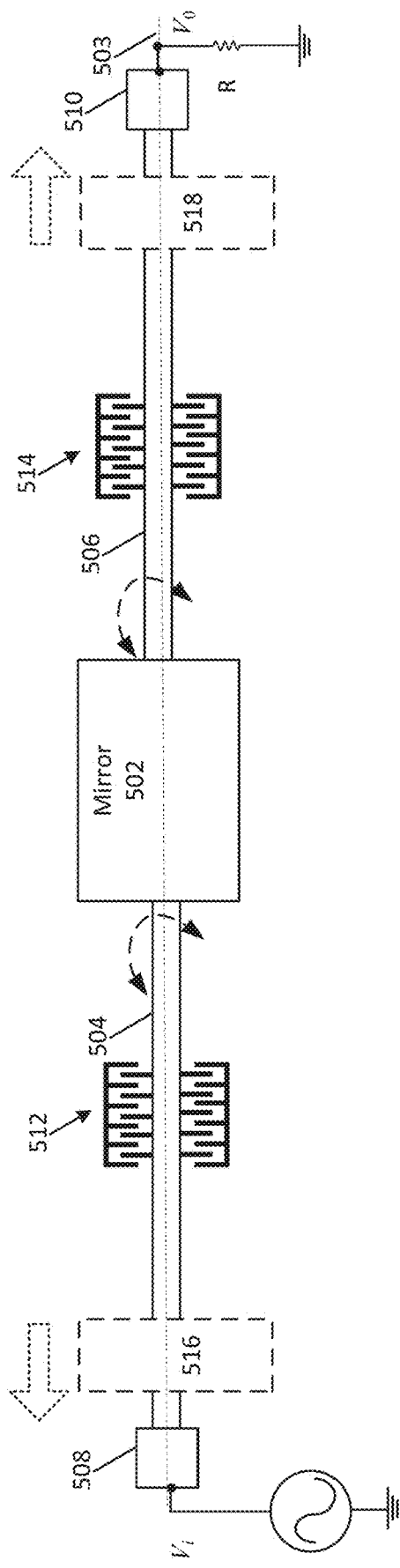
FIG. 5 illustrates a schematic diagram of another exemplary micromachined mirror assembly, according to embodiments of the disclosure.

In addition to indirectly translating a torsion into the tensional stress, another way to introducing tensional stress for increasing resonant frequency of a micro mirror is to directly apply a tensional stress through one or two suspended beams along the axis of the micro mirror. For example, FIG. 5 illustrates a schematic diagram of another exemplary micromachined mirror assembly 500, according to embodiments of the disclosure. Similar to micromachined mirror assembly 300 described above in FIGS. 3A-3B, micromachined mirror assembly 500 also includes a micro mirror 502, a first torsion beam 504 and a second torsion beam 506 each mechanically coupled to micro mirror 502 along an axis 503 of micro mirror 502, and a first anchor 508 and a second anchor 510 each fixed on the base of micromachined mirror assembly 500 and mechanically coupled to a respective end of first or second torsion beam 504 or 506. Micromachined mirror assembly 500 may also have first DC voltage $V_i$ and second DC voltage $V_0$ applied to torsion beams 504 and 506 in the same manner as the counterpart of micromachined mirror assembly 300 in FIGS. 3A-3B. In some embodiments, micromachined mirror assembly 500 further includes a first torsional actuator 512 mechanically coupled to first torsion beam 504 and configured to apply a first torsional stress around axis 503 to first torsion beam 504, and a second torsional actuator 514 mechanically coupled to second torsion beam 506 and configured to apply a second torsional stress around axis 503 to second suspended beam 506. The first torsional stress and second torsional stress may be different to create a torsion that can be translated into a tensional stress in the axial direction, as described above with respect to micromachined mirror assembly 300. The details of micro mirror 502, first and second torsion beams 504 and 506, first and second anchors 508 and 510, first DC voltage $V_i$ and second DC voltage $V_0$ and first and second torsional actuators 512 and 514 of micromachined mirror assembly 500 have been described above with respect to their counterparts of micromachined mirror assembly 300 in FIGS. 3A-3B and thus, are not repeated.

As shown in FIG. 5, micromachined mirror assembly 500 further includes a pair of tensional actuators 516 and 518 mechanically coupled to an end of respective first and second torsion beams 504 and 506 and configured to apply a tensional stress along axis 503 to first and second torsion beams 504 and 506. The tensional stress can be applied directly by tensional actuators 516 and 518 in the axial direction away from micro mirror 502 to increase the operational frequency of micro mirror 502. It is understood that in some embodiments, instead of having tensional actuators 516 and 518 on both sides of micro mirror 502 as shown in FIG. 5, only one of tensional actuators 516 and 518 is kept on one side of micro mirror 502, i.e., mechanically coupled to one of torsion beams 504 and 506, which still can apply a tensional stress along axis 503. Tensional actuators 516 and 518 can be any suitable actuators that can apply a tensional stress to first and second torsion beams 504 and 506 in the axial direction away from micro mirror 502, i.e., pulling first and second torsion beams 504 and 506 away from micro mirror 502 to increase the tension axially within micromachined mirror assembly 500, and thus, increase the resonant frequency of micro mirror 502 during its operation. Tensional actuators 516 and 518 can be, for example, electrostatic actuators, piezoelectric actuators, electromagnetic actuators, thermal actuators, etc.

Figure 6A:
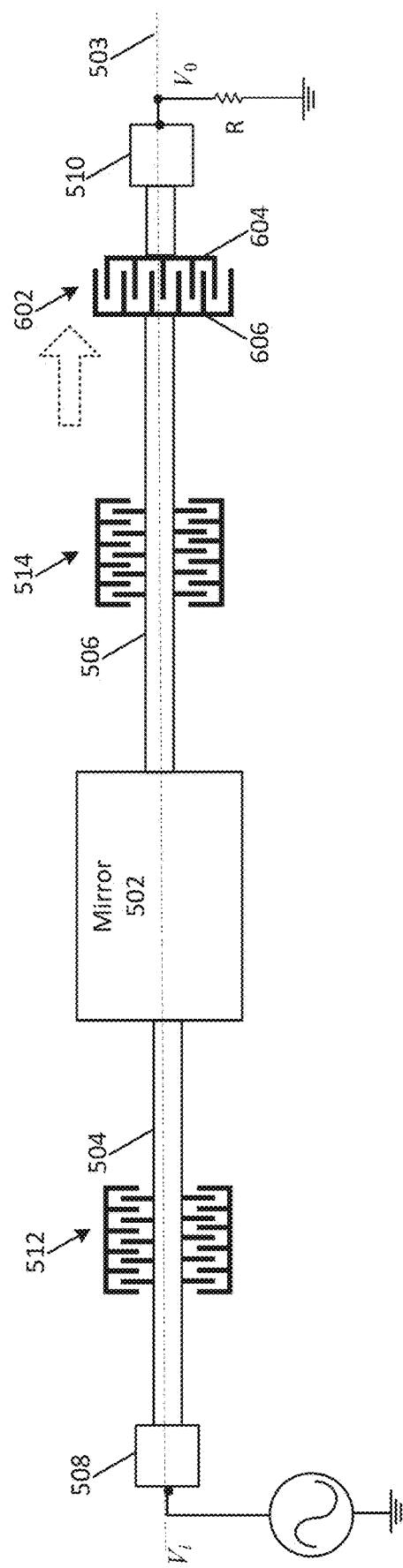
FIG. 6A illustrates a schematic diagram of a design of the exemplary micromachined mirror assembly in FIG. 5, according to embodiments of the disclosure.
Figure 6B:
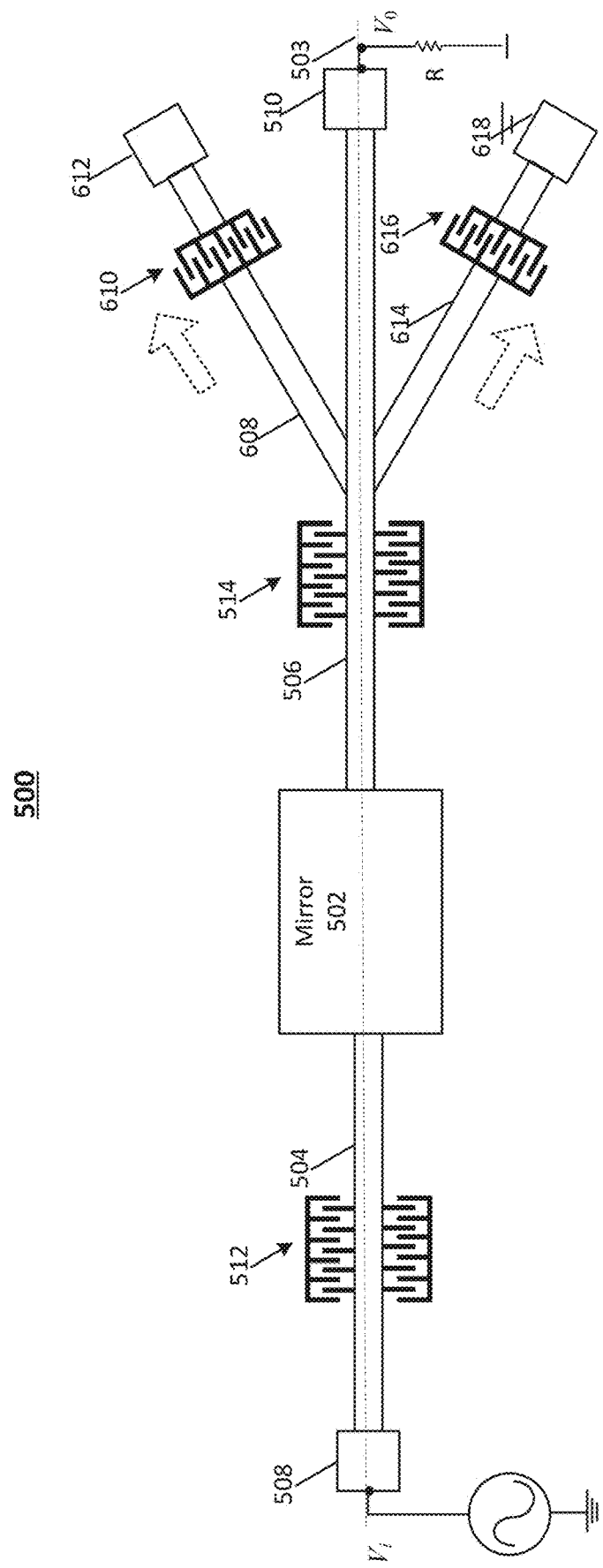
FIG. 6B illustrates a schematic diagram of another design of the exemplary micromachined mirror assembly in FIG. 5, according to embodiments of the disclosure.

For example, FIG. 6A illustrates a schematic diagram of a design of micromachined mirror assembly 500 in FIG. 5, according to embodiments of the disclosure. FIG. 6B illustrates a schematic diagram of another design of micromachined mirror assembly 500 in FIG. 5, according to embodiments of the disclosure. In both examples, a tensional actuator, such as one or more sets of comb drive electrostatic actuators, is disposed on one side of micro mirror 502 to apply a tensional stress along axis 503 of micro mirror 502 to increase the operational resonant frequency of micro mirror 502. It is understood that in other embodiments, another tensional actuator may be similarly disposed on the other side of micro mirror 502 as well.

In one design as shown in FIG. 6A, a set of comb drives 602 is mechanically coupled to an end of second suspended beam 506 and configured to apply a tensional stress along axis 503 to second torsion beam 506. In some embodiments, set of comb drives 602 include a fixed comb 604 fixed to second anchor 510 that does not move relative to the base of micromachined mirror assembly 500, and a movable comb 606 fixed to second torsion beam 506 that is movable along the axial direction. By applying a voltage to set of comb drives 602, movable comb 606 can be attracted by fixed comb 604 toward second anchor 510 and thus, create a tensional stress to second torsion beam 506 in the axial direction away from micro mirror 502. It is understood that fixed comb 604 may not be fixed to second anchor 510 in some embodiments. In some embodiments, fixed comb 604 is electrically separated from the rest of components (e.g., micro mirror 502, first and second torsion beams 504 and 506, first and second anchors 508 and 510, and movable comb 606) in micromachined mirror assembly 500.

In another design as shown in FIG. 6B, two sets of comb drives 610 and 616 each is mechanically coupled to a respective end of a first sub-torsion beam 608 and a second sub-torsion beam 614. First and second sub-torsion beams 608 and 614 may be mechanically coupled to a connection point of second torsion beam 506 in a certain angle to form rigid joints, such that tensional stresses applied to first and second sub-torsion beams 608 and 614 can be transferred to second torsion beam 506, which can be in turned transferred to micro mirror 502 along axis 503 of micro mirror 502 to increase the operational resonant frequency of micro mirror 502. In some embodiments, by changing the direction of the pulling of first and second sub-torsion beams 608 and 614 towards micro mirror 502, the operational resonant frequency of micro mirror 502 may be decreased. In some embodiments, the connection point is close to second anchor 510 to minimize the rotation of first and second sub-torsion beams 608 and 614 around axis 503. Similar to set of comb drive 602 described above with respect to FIG. 6B, each set of comb drives 610 or 616 may include a movable comb drive fixed to respective first sub-torsion beam 608 or second sub-torsion beam 614, and a fixed comb drive fixed to a respective anchor 612 or 618. By applying a voltage to each set of comb drives 610 or 616, each movable comb can be attracted by the respective fixed comb toward anchor 612 or 618 and thus, create a tensional stress to respective first sub-torsion beam 608 or second sub-torsion beam 614, which can be in turned transferred to second torsion beam 506 along axis 503.

As described above, the current introduced by first DC voltage $V_i$ and second DC voltage $V_O$ may decrease the resonant frequency of micro mirror 502 from its initial resonant frequency and in some embodiments, optionally, the tensional stress induced directly by tensional actuators 516 and/or 518 can increase the resonant frequency of micro mirror 502 from its initial resonant frequency. In some embodiments, a controller (not shown) is configured to dynamically tune the operational resonant frequency of micro mirror 502 by adjusting torsional stress on tensional actuators 516 and/or 518, and/or adjusting the current $i_O$ passes through torsion beams 504 and 506 and micro mirror 502 by adjusting first DC voltage $V_i$ and second DC voltage $V_O$. In some embodiments, an electrical resistance R may be added between the electrodes as part of an overcurrent protection circuit to protect the circuit from overcurrent.

FIG. 7 illustrates a flow chart of an exemplary method 700 for driving a micromachined mirror assembly, according to embodiments of the disclosure. For example, method 700 may be implemented by micromachined mirror assemblies 300 and 500 described above. However, method 700 is not limited to that exemplary embodiment. Method 700 may include steps S702-S704 as described below. It is to be appreciated that some of the steps may be optional to perform the disclosure provided herein. Further, some of the steps may be performed simultaneously, or in a different order than shown in FIG. 7.

In step S702, a resonant frequency of a micromachined mirror assembly is set at an initial value. The initial value may be pre-set by the design and fabrication process of the micromachined mirror assembly. In some embodiments, the initial value is pre-set as the maximized value, which can be decreased to a lower value during the operation by decreasing the resonant frequency during the operation of the micromachined mirror assembly.

In step S704, a DC voltage difference is applied along an axis of the micromachined mirror assembly to decrease the resonant frequency to a first operational value lower than the initial value during operation of the micromachined mirror assembly. In some embodiments, the DC voltage difference results in a current to pass through the torsion beams, and the micro mirror. The current may be transformed into heat on the torsion beams and the micro mirror. The heat may be transformed into thermal expansion thus lead to compression stresses applied to the micro mirror. The thermal expansion and the compression stresses may cause a decrease of the operational resonant frequency, thereby decreasing the first operational value. In some embodiments, the initial value of the resonant frequency is pre-set as the maximum value, such that the operational resonant frequency is decreased to the desired second operational value by applying a suitable level of heat to the micromachined mirror assembly.

It is understood that in some embodiments, the initial value of the resonant frequency of the micromachined mirror assembly is not pre-set at the maximum value, and step S704 can be performed in any suitable times to dynamically tune the initial value to a desired operational value.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A micromachined mirror assembly, comprising:
   a micro mirror configured to tilt around an axis; and
   a first torsion beam having a first end to which a first voltage is applied and a second end mechanically coupled to the micro mirror along the axis; and
   a second torsion beam having a first end to which a second voltage is applied and a second end mechanically coupled to the micro mirror along the axis,
   wherein the first voltage and the second voltage has an adjustable voltage difference.

2. The micromachine mirror assembly of claim 1, wherein the first voltage is a first DC voltage and the second voltage is a second DC voltage.

3. The micromachine mirror assembly of claim 1, wherein the voltage difference between the first voltage and the second voltage decreases a resonant frequency of the micro mirror.

4. The micromachine mirror assembly of claim 3, further comprising a controller configured to dynamically tune the resonant frequency of the micro mirror during operation of the micromachined mirror assembly by adjusting the voltage difference between the first voltage and the second voltage.

5. The micromachine mirror assembly of claim 1, wherein the first end of the first torsion beam is coupled to a first anchor, and the first end of the second torsion beam is coupled to a second anchor, wherein the first anchor and the second anchor is affixed to a based to suspend the first torsion beam and the second torsion beam over the base.

6. The micromachine mirror assembly of claim 5, wherein a first electrode is applied to the first anchor to provide the first voltage and a second electrode is applied to the second anchor to provide the second voltage.

7. The micromachine mirror assembly of claim 6, wherein an overload protection circuit is placed between the first electrode and the second electrode.

8. The micromachine mirror assembly of claim 6, further comprising:
   at least one actuator mechanically coupled to at least one of the first torsion beam or the second torsion beam, wherein the at least one actuator causes a tensional stress along the axis.

9. The micromachine mirror assembly of claim 8, wherein the at least one actuator comprises:
   a first torsional actuator coupled to the first torsion beam and configured to apply a first torsional stress around the axis to the first torsion beam; and the
   a second torsional actuator coupled to the second torsion beam and configured to apply a second torsional stress around the axis to the second torsion beam,
   wherein a difference between the first torsional stress and the second torsional stress causes the tensional stress along the axis.

10. The micromachine mirror assembly of claim 8, wherein the at least one actuator comprises at least one tensional actuator configured to cause the tensional stress along the axis.

11. The micromachine mirror assembly of claim 8, wherein the at least one actuator is an electrostatic actuator.

12. The micromachine mirror assembly of claim 8, wherein the tensional stress along the axis increases a resonant frequency of the micro mirror.

13. The micromachine mirror assembly of claim 12, further comprising a controller configured to dynamically tune the resonant frequency of the micro mirror during operation of the micromachined mirror assembly by adjusting the tensional stress along the axis.

14. A micromachined mirror assembly, comprising:
    a micro mirror configured to tilt around an axis;
    a first torsion beam and a second torsion beam each mechanically coupled to the micro mirror along the axis, wherein a voltage difference is applied to the first torsion beam and the second torsion beam; and
    at least one actuator mechanically coupled to at least one of the first torsion beam or the second torsion beam, wherein the at least one actuator causes a tensional stress along the axis.

15. The micromachine mirror assembly of claim 14, wherein the voltage difference applied to the first torsion beam and the second torsion beam decreases a resonant frequency of the micro mirror.

16. The micromachine mirror assembly of claim 14, wherein the tensional stress along the axis increases a resonant frequency of the micro mirror.

17. The micromachine mirror assembly of claim 14, further comprising a controller configured to dynamically tune a resonant frequency of the micro mirror during operation of the micromachined mirror assembly by adjusting the voltage difference applied to the first torsion beam and the second torsion beam or the tensional stress along the axis.

18. The micromachine mirror assembly of claim 14, wherein the at least one actuator comprises:
    a first torsional actuator coupled to the first torsion beam and configured to apply a first torsional stress around the axis to the first torsion beam; and
    a second torsional actuator coupled to the second torsion beam and configured to apply a second torsional stress around the axis to the second torsion beam,
    wherein a difference between the first torsional stress and the second torsional stress causes the tensional stress along the axis.

19. The micromachine mirror assembly of claim 14, wherein the at least one actuator comprises at least one tensional actuator configured to cause the tensional stress along the axis.

20. A method for driving a micromachined mirror assembly, comprising:
    operating the micromachined mirror assembly by tilting a micro mirror around an axis; and
    dynamically tuning a resonant frequency of the micro mirror during the operation of the micromachined mirror assembly by adjusting a voltage difference applied to a first torsion beam and a second torsion beam each mechanically coupled to the micro mirror along the axis or a tensional stress along the axis.

* * * * *